(12) United States Patent
Tobin

(10) Patent No.: US 6,230,653 B1
(45) Date of Patent: May 15, 2001

(54) WATER BOWL FOR PETS

(76) Inventor: Dennis R Tobin, 950 Bannock Ct., Concord, CA (US) 94518

( * ) Notice: Subject to any disclaimer, the term of this patent is extended or adjusted under 35 U.S.C. 154(b) by 0 days.

(21) Appl. No.: 09/534,618

(22) Filed: Mar. 27, 2000

(51) Int. Cl.[7] ................................................. A01K 7/00
(52) U.S. Cl. .................................................................. 119/72
(58) Field of Search ............................. 119/51.5, 74, 61

(56) References Cited

U.S. PATENT DOCUMENTS

| | | | | |
|---|---|---|---|---|
| 3,810,446 | * | 5/1974 | Kightlinger et al. | 119/61 |
| 4,691,664 | * | 9/1987 | Crowell | 119/61 |
| 4,800,845 | * | 1/1989 | Budd | 119/61 |
| 4,953,506 | * | 9/1990 | Sanders | 119/61 |
| 5,005,524 | * | 4/1991 | Berry | 119/61 |
| 5,209,184 | * | 5/1993 | Sharkan et al. | 119/61 |
| 5,526,773 | * | 6/1996 | Richardson | 119/61 |
| 5,619,952 | * | 4/1997 | Walker | 119/61 |

* cited by examiner

Primary Examiner—Thomas Price
(74) Attorney, Agent, or Firm—Risto A. Rinne, Jr.

(57) ABSTRACT

Water bowl for pets with a water retaining vessel having a bowl shape, a cooling disk, a device for retaining the cooling disk to the bottom of the bowl, a device for easily removing the cooling disk, and a non-skid ring at the bottom of the bowl, the cooling disk being comprised of a rigid shell and having a freezable material within the shell so that the disk can be brought to a low temperature in a standard freezer compartment of a refrigerator and then placed in said bowl to keep said water cool on hot days.

6 Claims, 3 Drawing Sheets

WATER BOWL FOR PETS

BACKGROUND OF THE INVENTION

This invention relates generally to the field of pet watering devices, and more particularly to a self cooling water bowl for pets.

It is known that pets as well as all animals need to drink water on a regular basis to maintain their lives.

Pet owners feed water to their pets, such a dog or a cat, by leaving a bowl of water in a convenient location. When the pet is thirsty, he or she drinks a quantity of water from the bowl.

Although this method is adequate during cool weather, there are occasions during hot weather periods where the water in the bowl becomes warmer than is healthy for the pet. Clinical tests have shown that pets prefer cooler water during hot days because it helps to lower there overall body temperature and thereby become more comfortable. It is a known fact that if a pet becomes too hot it can lead to heat stress and ultimatly heat stroke. Pet water bowls that exist currently do not have the ability to cool the water contained in the bowl to the degree that is preferable during hot weather conditions.

SUMMARY OF THE INVENTION

The primary object of the invention is to provide a water bowl for pets that keeps the water cool even when placed in warm locations.

Another object of the invention is to provide a means of removing and replacing a cooling disk that can be seated in the bottom of a bowl.

Other objects and advantages of the present invention will become apparent from the following descriptions, taken in connection with the accompanying drawings, wherein, by way of illustration and example, an embodiment of the present invention is disclosed.

Water bowl for pets comprising: a water retaining vessel having a bowl shape, a cooling disk, a means for retaining said cooling disk to the bottom of said bowl, a means for easily removing said cooling disk, and a non skid ring at the bottom of said bowl, said cooling disk being comprised of a rigid shell and having a freezable material within said shell so that said disk can be brought to a low temperature in a standard cool on hot days.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
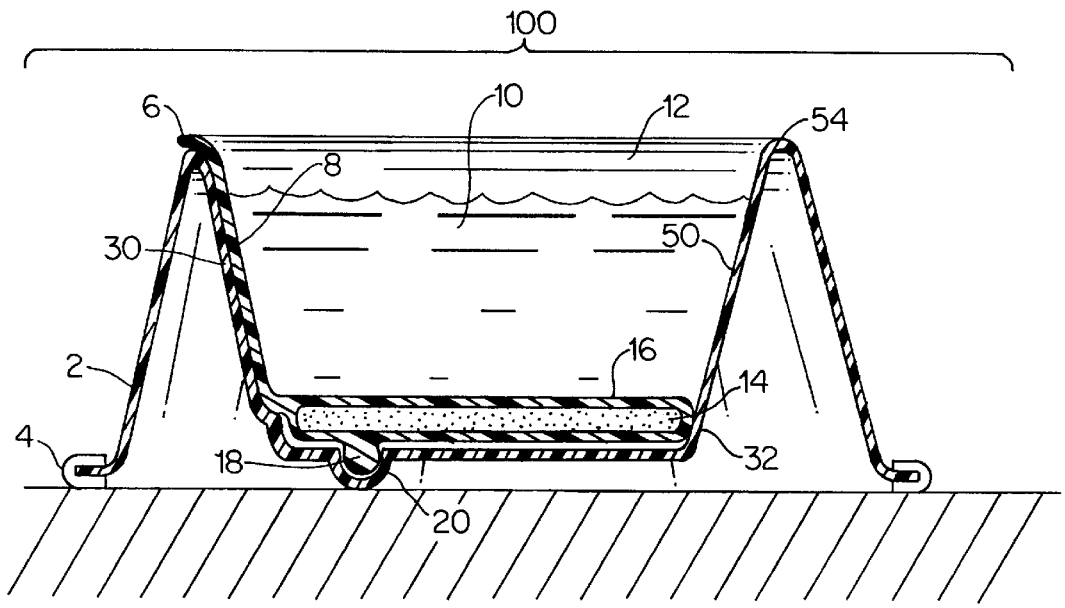
FIG. 1 is a side section view of the pet water bowl of the present invention

Referring now to FIG. 1 we see a side section view of the present invention 100. A water bowl comprised of an inner bowl portion 50 and surrounded by an outer bowl portion 2 connected by top rim 54. A ring of non-slip material 4 is fastened to the bottom perimeter of outer bowl 2 so that the bowl will not skid when a pet, such as a dog, drinks from the bowl 50. At the bottom section 32 of inner bowl 50 we see a shell portion 16 that encloses a freezable substance 14. One trade name for the freezable substance is Blue Ice and can be found in most markets and camping stores. It is commonly used in conjunction with an insulated container and helps keep food or drinks cold. It is a replacement for ice cubes which tend to melt thereby creating unwanted liquid in the container. The disk shaped container 16 is held to the bottom of the bowl portion 32 by means of a ball 18 that is molded into the bottom of container 16 and can be removably replaced into ball socket 20 molded into the bottom of bowl portion 50. This is necessary because the disk shaped container 16 and its contents 14 tend to float in water. When disk shape 16 is placed in a conventional freezer compartment of a standard refrigerator, the contents 14 of the shell 16 reach temperatures of approximately twenty eight degrees F within one hour. When the frozen disk 16 is placed in the bottom of bowl 50, the water 10 that sits on top of disk 16 becomes cold and remains that way for a number of hours, depending on ambient temperature and the size of the cooling disk 16, before losing its capacity to cool water 10. Because the disk 16 is tightly fit to the walls of bowl 50 at area 32, a pet, such as a dog, can not easily dislodge the disk 16 from the bowl. The disk 16 is removed from bowl 50 by pulling up on tab 6. Tab 6 connects to flat member 8 which in turn connects to disk 16. Flat member 8 is inset into a slightly depressed area 30 on the side of bowl 50 so that the pet can not easily get at flat member 8. In this way a pet, such as a dog, can drink cool water 10 without dislodging or disfiguring disk 16 or associated flat member 8 and tab 6.

Figure 2:
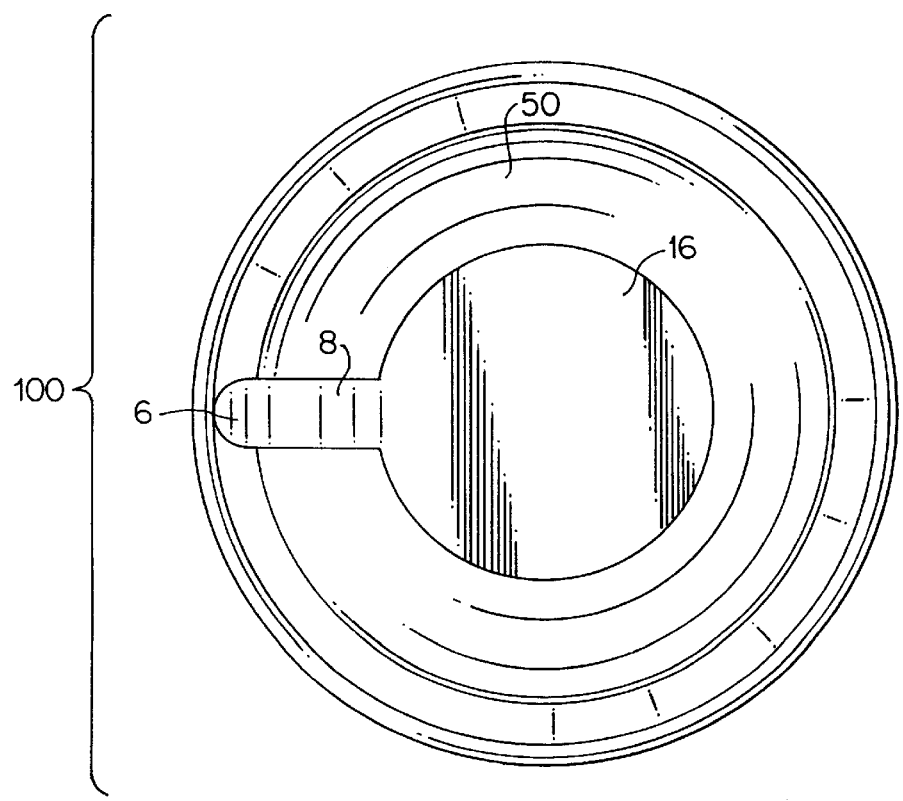
FIG. 2 is a top view of the pet water bowl of the present invention.
Figure 3:
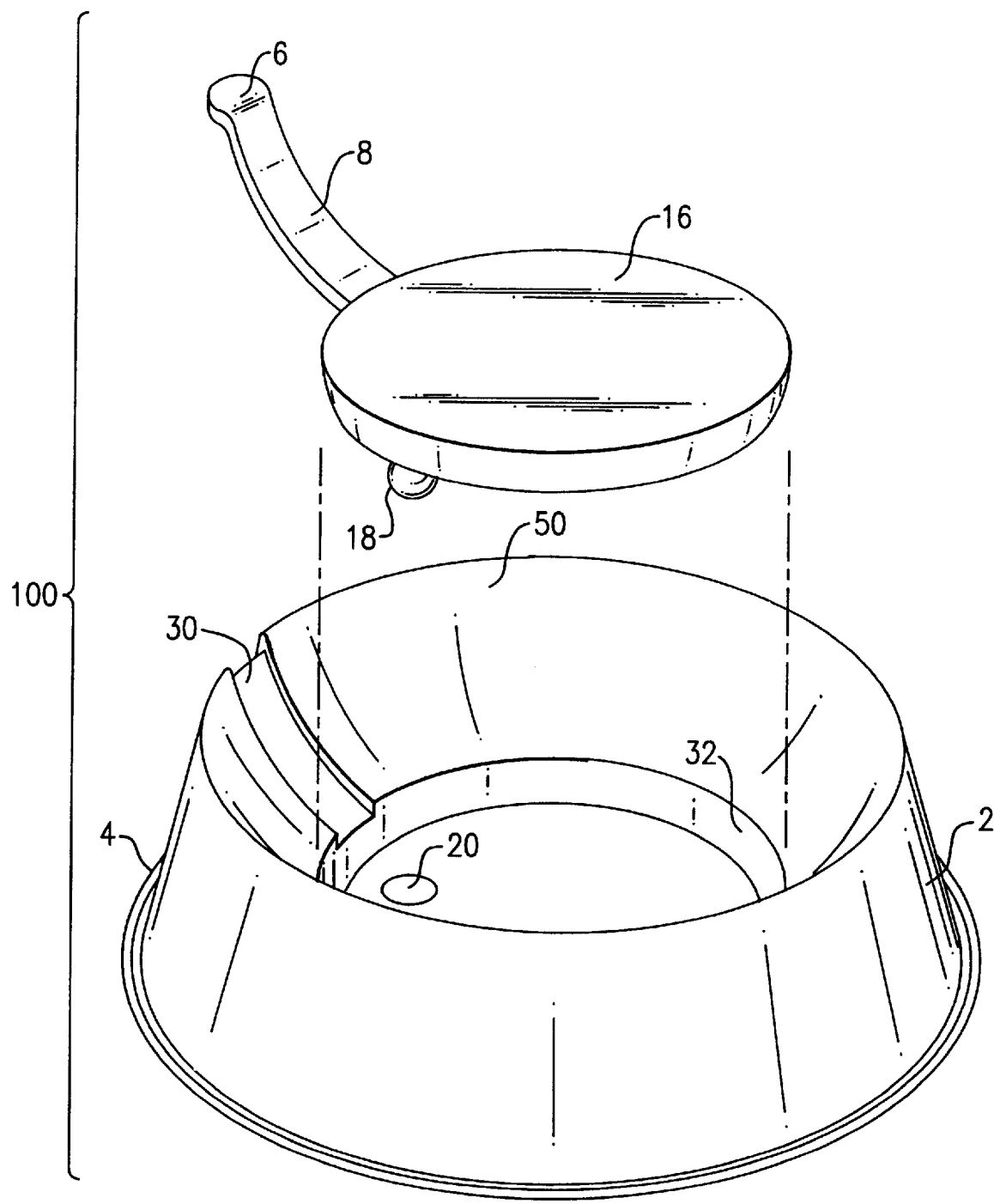
FIG. 3 is an exploded perspective view of the present invention.
Figure 4:
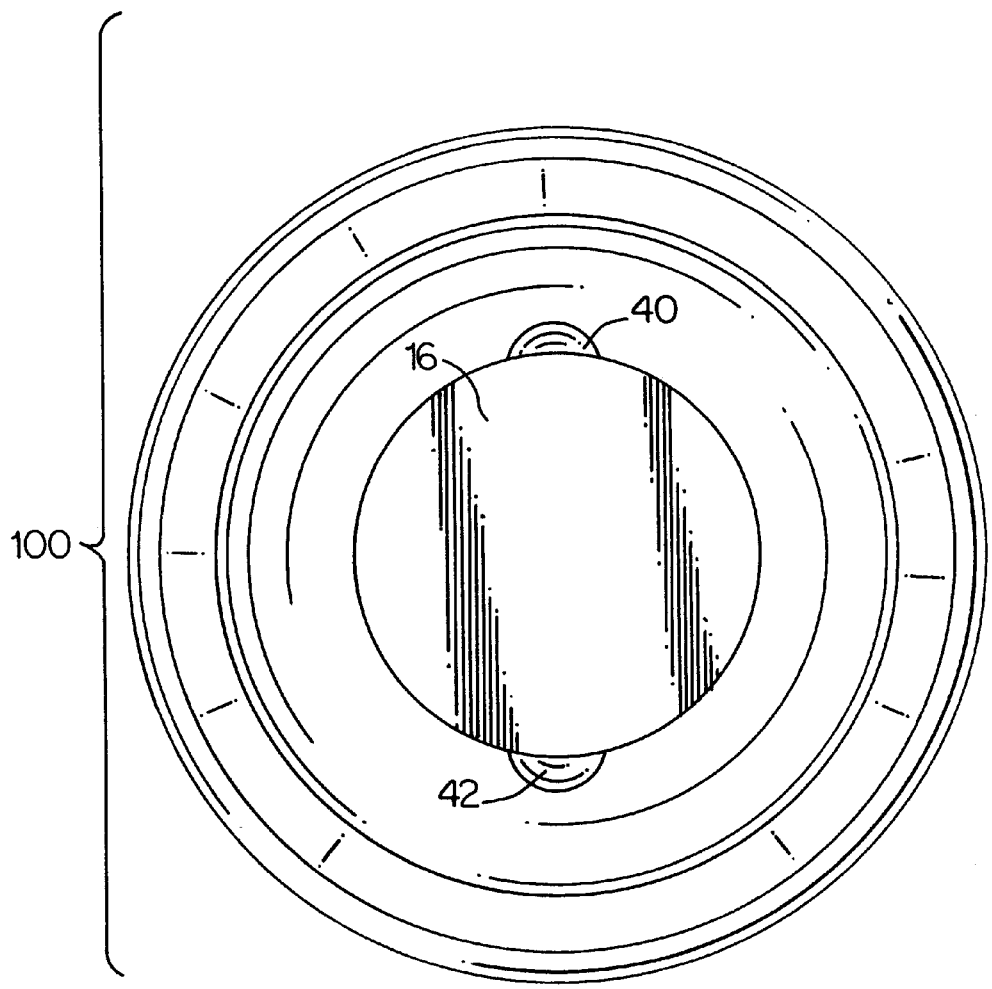
FIG. 4 is a top view of an alternate embodiment of the present invention

FIG. 2 shows a top view of the present invention 100. Disk 16 fits snuggly in the bottom of bowl 50 so that a pet will not be tempted to chew on or otherwise remove the disk 16. Tab 6 and flat member 8 are also set into the wall of bowl 50 so that there are no pieces of plastic protruding into bowl 50. FIG. 3 shows a exploded perspective view of the present invention 100. Disk 16 is ready to be inserted into the bottom of bowl portion 32. Ball 18 will mate with ball socket 20 thereby holding disk 16 to the bottom of bowl 50. FIG. 4 shows an alternate embodiment where disk 16 does not have a connected flat member 8 and tab 6. Instead there are a pair of depressed areas 40, 42 that allow a person to put their thumb and forefinger down around the side of disk 16 thereby allowing the user to pull disk 16 out and replace it. The present invention 100 could be sold with a plurality of disks 16 so that when one began to loose its effectiveness, another could be ready to replace it while the fist gets recharged in the to the bottom of bowl 50. These include hook and loop fastener magnets and others.

In the above described and illustrated way, a pet can have cool, healthful water even on the hottest days. The cooling device can be easily removed and replaced and does not offer any protuberances for a pet to dislodge or chew on.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Water bowl for pets comprising:

a water retaining vessel having a bowl shape;

a cooling disk;

a means for retaining said cooling disk to the bottom of said vessel, said means for retaining including a ball attached to a bottom of said cooling disk, said ball extending a predetermined distance from said bottom of said cooling disk and including a socket formed in said bottom of said vessel whereby said socket is adapted to receive said ball subsequent to a force being applied to said cooling disk sufficient to urge said ball into said socket;

a means for easily removing said cooling disk; and a non skid ring at the bottom of said bowl, said cooling disk being comprised of a rigid shell and having a freezable material within said shell so that said disk can be brought to a low temperature in a standard freezer compartment of a refrigerator and then placed in said bowl to keep said water cool on hot days.

2. The water bowl of claim 1 wherein said cooling disk includes means for providing a handle, said means for providing a handle including a flat member attached thereto and extending a predetermined distance therefrom, said flat member including an arcuate portion having a contour that corresponds with the contour of an interior sidewall of said vessel when said cooling disk is retained to said bottom of said vessel.

3. The water bowl of claim 2 wherein said flat member includes a tab attached at a distal end thereof with respect to where said flat member is attached to said cooling disk and wherein said tab extends a predetermined distance beyond a top of said vessel when said cooling disk is retained to said bottom of said vessel.

4. The water bowl of claim 2 wherein said vessel includes a depressed area in said sidewall, said depressed area adapted to receive said flat member therein when said cooling disk is retained to said bottom of said vessel.

5. The water bowl of claim 4 wherein said depressed area is adapted to retain said flat member sufficient to prevent any portion thereof from extending into an interior portion of said vessel when said cooling disk is retained in said bottom of said vessel.

6. Water bowl for pets comprising:

a water retaining vessel having a bowl shape;

a cooling disk;

means for retaining said cooling disk to the bottom of said vessel; and means for removing said cooling disk including a pair of depressed areas that are diametrically opposed with respect to each other, said pair of depressed areas being formed in a bottom of said vessel whereby said depressed areas are adapted to receive a thumb of a user in one of said depressed areas and a forefinger of a user in another of said depressed areas sufficient to permit grasping of said cooling disk and its removal apart from said vessel.

* * * * *